United States Patent [19]

Smock

[11] 4,418,271
[45] Nov. 29, 1983

[54] CONTROL SYSTEM INCLUDING A TIMING MECHANISM FOR A DRYING APPARATUS

[75] Inventor: Steven W. Smock, Indianapolis, Ind.

[73] Assignee: Emhart Industries, Inc., Indianapolis, Ind.

[21] Appl. No.: 374,185

[22] Filed: May 3, 1982

Related U.S. Application Data

[63] Continuation of Ser. No. 192,948, Oct. 2, 1980, abandoned.

[51] Int. Cl.³ ............................................. H05B 1/02
[52] U.S. Cl. ...................................... 219/493; 34/53; 34/48; 219/491; 219/508; 219/492
[58] Field of Search ............................... 219/490–493, 219/505–511; 34/53, 44, 45, 48, 59; 236/46 R, 46 F

[56] References Cited

U.S. PATENT DOCUMENTS

| | | | |
|---|---|---|---|
| 3,302,001 | 1/1967 | Frazier | 219/491 |
| 3,624,918 | 12/1971 | Heptler | 219/493 |
| 3,713,226 | 1/1973 | Takeyama et al. | 34/48 |
| 4,019,259 | 4/1977 | Veraat | 34/48 |
| 4,083,118 | 4/1978 | Cotton | 34/53 |

*Primary Examiner*—M. H. Paschall
*Attorney, Agent, or Firm*—Robert F. Meyer

[57] ABSTRACT

An electrical circuit electrically connects a timer motor for a timer in parallel with a thermostat means, the thermostat being electrically connected in series with a heating mechanism. With such a connection, heat may be applied to a drying apparatus while the timer is not running and when the thermostat opens to shut off the heat, the timer motor will run to operate the timer to advance the timer through the time cycle.

The timing mechanism or timer for the control system includes at least one set of switching structures responsive to a cam, the switching structure including a terminal block, and first and second electrical contact blades cantilevered on opposite sides of the terminal block and cooperating electrical contacts to open and close electrical circuits.

5 Claims, 3 Drawing Figures

CONTROL SYSTEM INCLUDING A TIMING MECHANISM FOR A DRYING APPARATUS

This application is a continuation of Ser. No. 192,948, filed Oct. 2, 1980, now abandoned.

BACKGROUND OF THE INVENTION

Generally speaking, the present invention pertains to a control system for an apparatus wherein material is dried by heat, the control system regulating the amount of time and heat applied thereto. In general, the control system comprises a timing mechanism including a timer motor, cam means coupled to the timer motor, and switch means responsive thereto to open and close electrical circuits to heating means and the timer motor; temperature regulating means electrically connected in series with the heating means; and electrical circuit means electrically connecting the timer motor in parallel with the temperature regulating means.

The timing mechanism used in the control system in general comprises a motor drive means, cam means coupled to the motor drive means to be rotated thereby; at least one set of switching structures responsive to the cam means comprising a terminal block, a first electrical contact blade cantilevered on a side of the terminal block, a second electrical contact blade cantilevered on an opposite side of the terminal block, and first electrical contacts carried by the contact blades each engaging at least one second electrical contact to complete electrical circuits therethrough; and electrical terminals connected to the electrical contacts.

The present invention pertains to a control system, and more particularly to a control system regulating the amount of time and heat that is applied to a fabric being dried and a timing mechanism used in such control system.

As is well known in the appliance industry, the number of different types of fabric needed to be dried in automatic clothes dryers is constantly increasing. This has caused the control systems used to regulate the heat in the appliance to become complicated and expensive to produce. More specifically, all fabrics hold a certain amount of moisture and over-drying removes this natural moisture and sets wrinkles, making clothing harsh, and apparent shrinkage may occur. Therefore, certain fabrics cannot be exposed to high temperatures for too long a period and, therefore, the heat must be shut off when a desired temperature is reached. In some cases, the clothes may not be sufficiently dry at that temperature. And when the heat is turned off, the clothes will cool down due to evaporation. Thus, the amount of moisture in the fabric will determine the amount of time and heat required to complete a cycle. Therefore, the control system regulating the amount of heat being applied to the fabric must provide a means to reapply heat until the proper dryness is reached at which time the fabric is cooled to room temperature and the drying cycle is completed.

OBJECTS OR FEATURES OF THE INVENTION

It is, therefore, a feature of the present invention to provide a control system regulating the amount of time and heat that is applied in a drying apparatus. Another feature of the invention is to provide such a control system having a timing mechanism which includes a timer motor, cam means coupled to the timer motor, and switch means responsive thereto to open and close electrical circuits to heating means and the timer motor. Another feature of the invention is to provide such control system having a temperature regulating means electrically connected in series with the heating means. Still another feature of the invention is to provide such a control system having electrical circuit means electrically connecting the timer motor in parallel with the temperature regulating means. Another feature of the invention is to provide such electrical circuit means wherein the timer motor is connected to the heating means through a switch and line voltage is connected to the temperature regulating means through a switch. Another feature of the invention is to provide a timing mechanism useful for the control system. Yet another feature of the invention is to provide such a timing mechanism wherein a set of switching structures includes a terminal block and first and second electrical contact blades cantilevered on opposite sides of the terminal block. Still another feature of the invention is to provide such a timing mechanism wherein the set of switching structures includes first electrial contacts carried by the contact blade each engaging at least a second electrical contact to complete electrical circuits therethrough and electrical terminals connected to the electrial contacts. A further object of the invention is to provide a timing mechanism wherein there is another similar set of switching structures disposed opposite the first set. These and other features of the invention will become apparent in the following description taken in conjunction with the accompanying drawings.

DETAILED DESCRIPTION OF THE INVENTION

Figures 1, 2:
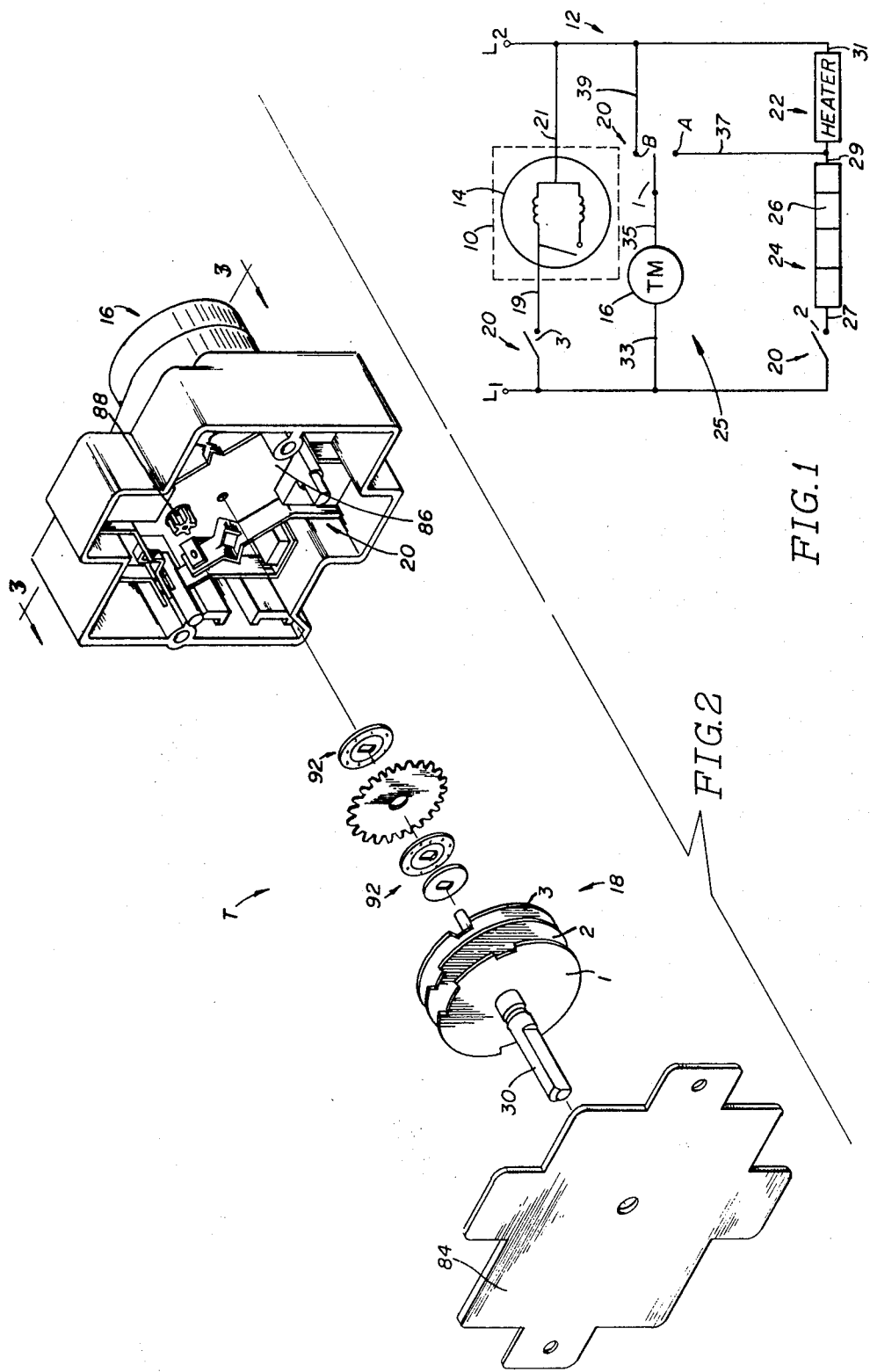
FIG. 1 is a wiring diagram schematically showing the control system of the present invention.
FIG. 2 is an exploded view of a timing mechanism used in the control system of the invention.

Referring to FIG. 1, there is schematically shown an appliance 10 such as an automatic dryer and a control system 12 for regulating the appliance. Included as part of the appliance is a drive motor 14 which operates the dryer blower and the drum in which the clothes are dried. Control system 12 includes a timing mechanism T (FIG. 2) having a timer motor 16, cam means 18, and switch means 20 responsive to the cam means to open and close electrical circuits, a heating means 22, temperature regulating means 24 electrically connected in series with the heating means, and an electrical circuit means 25 electrically connecting the timer motor in parallel with the temperature regulating means to apply power to the timer motor and thus timing mechanism T. As shown, switch means 20 includes a double throw switch 1 and two single throw switches 2 and 3 which operate off of cams 1, 2 and 3 respectively.

Power to the appliance, including its drive motor, is supplied from AC power source $L_1$ $L_2$ through switch 3 and lines 19 and 21. Power is supplied to temperature regulating means 24 and heating means 22 through switch 2, and lines 27, 29 and 31.

As shown, electrical circuit means 25 connecting the timer motor 16 in parallel with temperature regulating means 24, includes lines 33, 35 and 37, and contact A of double throw switch 1. Alternatively, power may be applied to the timer motor directly from power source $L_1$ $L_2$ through lines 33, 35 and 39 and contact B of switch 1. Switch 1, as shown, also has a neutral position, which as will be described, permits power to the timer motor to be shut off.

Heating means 22 may be either of gas or electric type heater commonly used in the dryer industry. Temperature regulating means 24 includes a series of thermostats 26 so that various desired temperature settings may be provided.

In one operating mode, the appliance operator manually sets cams 1, 2 and 3 through manual rotation of the cams to close switches 2 and 3 and th close switch 1 with contact A. One of the thermostats 26 is manually set to open at a desired temperature. When electrical power is then applied to the appliance, heating means 22 will apply heat to the appliance, drive motor 14 will be operating to operate the blower and the drum holding the clothes, and timer motor 16 will be off. Upon reaching a desired temperature, the selected thermostat will open. The electrical power will now go through the timer motor to run the timer to run out time on the timer cycle. With no heat being applied to the appliance, the dryer will cool down until such time as the thermostat closes to again apply heat to the appliance, and the timer motor turns off. The sequence is repeated until the timer motor runs out the end of the timer cycle. As the timer nears the end of its cycle, switch 2 opens before the end of the cycle. Because of the location of switch 2, the timer continues to run out to the end of the cycle at which time switches 3 and 1 open to shut off all of the power without heat being applied to the fabric. Thus the drum will continue to operate during cool down to assure a proper cool down of the fabric.

In the other operating mode, the appliance operator manually sets cams 1, 2 and 3 such that switches 2 and 3 are closed and cam 1 is closed with contact B. In this mode, heat is applied continually through the thermostat to the dryer while the drive motor continually operates and the timer motor continually rotates the cams until the end of the cycle. Thus there is no intermittent turning off and on of the timer motor 16.

Figure 3:
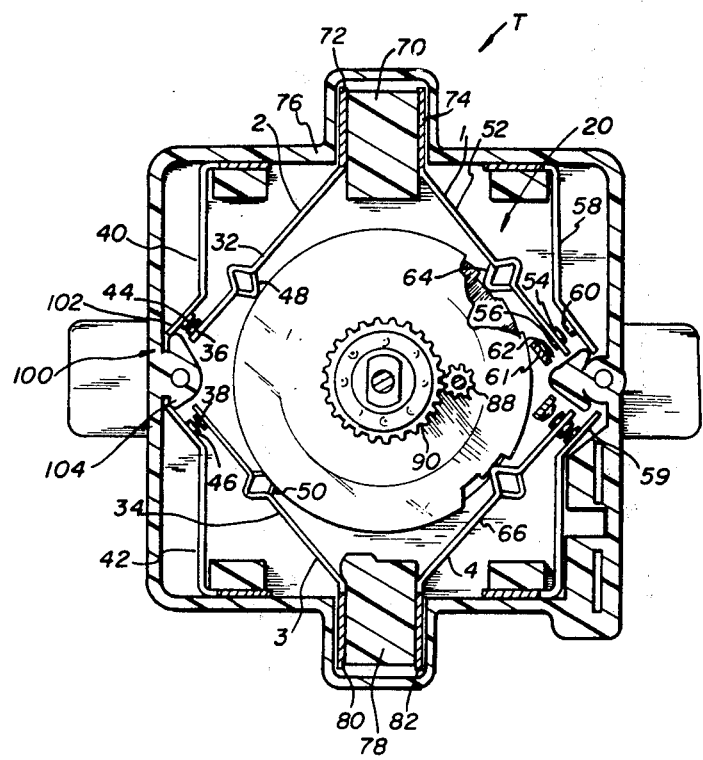
FIG. 3 is a view taken along the line 3—3 of FIG. 2.

Referring now to FIGS. 2 and 3, there is shown a timing mechanism T which may be used in the control system of FIG. 1. Timing mechanism T in general includes cam means 18 fixedly carried on a shaft 30, switch means 20 and timer motor drive means 16. Cam means 18 includes cams 1, 2 and 3 previously described. Switch means 20 includes switches 1, 2 and 3 previously described and another switch 4 which may be used if desired. Switches 2 and 3 are single throw switches each including an electrical contact blade 32 and 34 with their electrical contacts 36 and 38, and electrical contact blades 40 and 42 with their electrical contacts 44 and 46. Contact blades 2 and 3 engage cams 2 and 3 through cam followers 48 and 50. Switch 1 is of a double throw and includes switch blade 52 which carries electrical contacts 54 and 56, electrical contact blade 58 which carries electrical contact 60 and an electrical contact blade 61 which carries electrical contact 62. Electrical contact blade 52 engages cam 1 through follower 64.

Electrical contact blades 32 and 52 are integral with electrical terminals 72 and 74 and are cantilevered against terminal block 70 and housing 76 for the timing mechanism. Likewise electrical contact blades 34 and 66 are integral with electrical terminals 80 and 82 and are cantilevered against terminal block 78 and housing 76 of the timing mechanism. The use of the contact blades in sets of two, cantilevered against a single terminal block, provides an arrangement that is particularly adaptable to the control system previously described. More specifically, in order to provide the parallel connection of the timer motor 16 to the temperature regulating means 24, the various switch blades must be electrically isolated. The arrangement described provides such isolation in a neat and compact manner.

A stop means 100 is located at the ends 102 of each of the contact blades 40, 42, 58 and 59 to limit their travel. Stop means 100 includes lobes 104 extending from housing 76 of the timer.

Shaft 30 is rotatably journalled in end plate 84 of the timer housing and the base 86 of housing 76. Shaft 30 is rotatably driven by motor drive means 16 through motor output pinion 88 and gear 90 which is rotatably carried on the shaft and coupled thereto through clutch means 92. Clutch means 92 is of a well known friction type and permits manual rotation of the shaft independent of the motor drive means.

In operation, the cams may be manually set through rotation of shaft 30 through clutch means 92 to set switches 1-3 in the manner previously described. Power driven rotation is then applied to the cams by either of the alternate operating modes previously described to rotate the cams and open and close the electrical switches.

What is claimed is:

1. In a dryer including a dryer motor wherein material is dried through heat, a control system regulating the amount of time and heat applied thereto, comprising:
   (a) a timing mechanism including a timer motor, cam means coupled to said timer motor, and cam switch means responsive to said cam means to open and close electrical circuits including a first cam switch connected to said dryer motor, a second cam switch connected to a temperature regulating means, and a two position cam switch,
   (b) temperature regulating means electrically connected in series with a heating means, and
   (c) electrical circuit means including said two position switch means wherein when said two position switch means is in a first position said timer motor is in parallel with said second cam switch, said temperature regulating means and said heating means, and when in a second position said timer motor is in parallel with said temperature regulating means and said second cam switch means and in series with said heating means.

2. In an apparatus according to claim 1 wherein said temperature regulating means includes at least one thermostat.

3. A timing mechanism comprising a motor drive means, cam means coupled to said motor drive means to be rotated thereby, switching structures responsive to said cam means comprising:
   (a) first and second terminal blocks disposed opposite each other with said cam means disposed between same,
   (b) first and second electrical contact blades cantilevered on a side of each of said terminal blocks and extending toward said cam means,
   (c) third and fourth electrical contact blades cantilevered on an opposite side of each of said terminal blocks and extending toward said cam means, and
   (d) first electrical contacts carried by each of said contact blades each engaging a second electrical contact to complete electrical circuits therethrough and electrical terminals connected to said electrical contacts, and a third electrical contact engaging one of said second electrical contacts to complete another electrical circuit therethrough to provide a double pole switch.

4. A timing mechanism according to claim 3 wherein said second electrical contacts are carried by second electrical contact blades cantilevered on terminal blocks.

5. A timing mechanism according to claim 3 further including stop means disposed at a distal end of said contact blades limiting their travel.

* * * * *